United States Patent Office 3,075,806
Patented Jan. 29, 1963

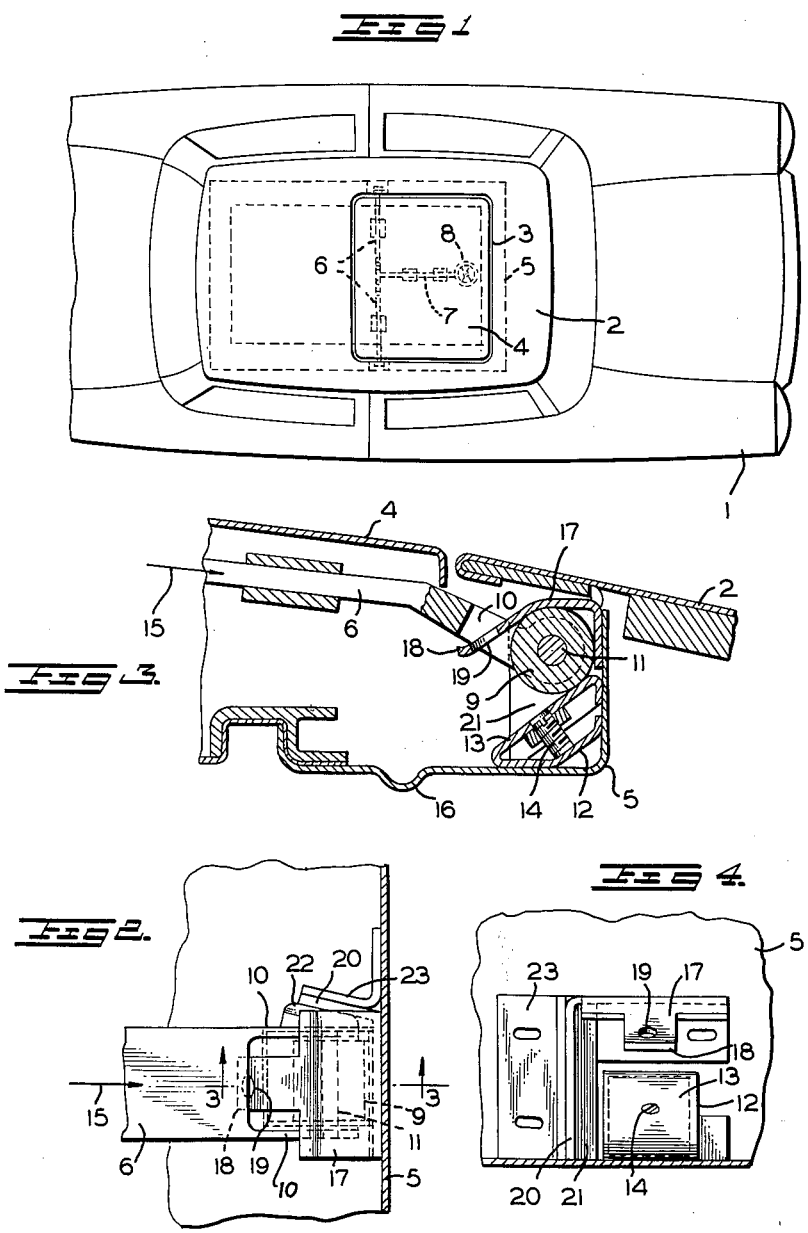

3,075,806
SLIDABLE ROOF CONSTRUCTION
Günter Gmeiner and Hans Lemmerzahl, Sindelfingen Kreis Boblingen, Germany, assignors to Daimler-Benz Aktiengesellschaft, Stuttgart-Unterturkheim, Germany
Filed Dec. 3, 1959, Ser. No. 857,050
Claims priority, application Germany Dec. 3, 1958
9 Claims. (Cl. 296—137)

The present invention relates to a closure mechanism for slidable roofs of vehicles, especially of motor vehicles in which an aperture provided preferably in the forward part of the roof may be closed by means of a roof insert adapted to be displaced in the vehicle longitudinal direction within a guide frame which roof insert, during opening thereof toward the rear, slides underneath the relatively fixed part of the roof, whereby closure or locking rods that are movable transversely to the vehicle longitudinal direction are suitably arranged at the roof insert and sliding roller members which are supported at the ends of the locking rods run up along wedging members provided at the guide frame during closure of the aperture in order to effectively lift the roof insert into the plane of the relatively fixed roof structure.

In connection with the prior art slidable roof constructions of this type it has been established that in particular the opening of the roof insert cannot always be carried out quite simply especially with relatively greater vehicle velocities by reason of the suction effect produced thereby and acting on the surface of the roof insert.

The disadvantages of the prior art construction are obviated by the present invention which essentially consists in the provision of guide means for the sliding roller members above each wedging member which guide means extend essentially parallel to the surface of the wedging members whereby the operating disadvantages encountered with the prior art are effectively and advantageously eliminated because the guide means above the wedging members effectively guide the sliding roller members supported at the ends of the locking rods against the effect of the suction acting on the roof insert in the direction toward the inside of the vehicle interior space along the wedging surfaces of the wedging members so that a relatively easy retracting movement of the roof insert toward the rear is rendered possible thereby.

The present invention further consists in the provision preferably at or near the wedging member of an additional wedging surface urging or forcing the roof insert forwardly in the closing direction thereof which cooperates with a complementary wedging surface arranged at the locking rod or at the sliding roller member. By the use of such an arrangement a particularly good sealing action of the edge of the roof insert exposed to the driving wind with the remainder of the fixed roof structure may be achieved during closure of the roof insert.

According to a further feature of the present invention, the guide means extending essentially parallel to the wedging surface of the wedging member may consist of a sheet-metal guide member which is rigidly connected or formed integrally with a guide frame. The free end of the sheet-metal guide member may thereby be bent slightly upwardly. In order to keep the friction between the sheet-metal guide member and the sliding guide roller member as low as possible the sheet-metal guide member has advantageously a lesser width than the sliding roller member. In order to achieve constructionally a favorable solution, the locking rod may be constructed in a fork-like manner at the end thereof to support thereon the sliding roller member, and the sheet-metal guide member extending above the wedging surface may extend partly through the fork aperture behind the sliding roller member with the roof insert in the closed position.

Advantageously, the additional wedging surface operative to force or push the roof insert forwardly into the closed position may be formed by an angularly bent sheet metal member secured at the vehicle frame, the leg portion of which forming the wedging surface is reinforced by additional sheet metal members secured to the vehicle frame. The complementary wedging surface cooperating with the additional wedging surface pressing the roof insert forwardly thereof in the closing direction may be arranged advantageously laterally at the respective locking rod. It is thereby particularly advantageous if the sheet-metal guide member for the sliding roller member and the angularly bent sheet metal member forming the additional wedging surface consist of a unitary structural part.

Accordingly, it is an object of the present invention to provide a slidable roof construction for motor vehicles of the type described hereinabove which obviates the disadvantages encountered with the prior art constructions.

Still another object of the present invention resides in the provision of a slidable roof construction and locking mechanism therefor which eliminates in an effective manner and by simple means the disadvantages encountered in the prior art constructions.

Still a further object of the present invention is the provision of guide means for a slidable roof insert in vehicles which makes possible to open and close the roof insert in an easy manner under all operating conditions of the vehicle.

A still further object of the present invention is the provision of guide means for a slidable roof insert in vehicles which is operative to minimize effectively the suction effect on the roof produced at relatively high vehicle speed that might otherwise impair easy opening of the slidable roof insert.

Another object of the present invention is the provision of guide means for a slidable roof which during closing of the slidable roof insert assure good sealing, particularly along the exposed front end of the roof insert.

Still a further object of the present invention is the provision of a simple guide means for a slidable roof structure including rigid and sturdy wedging surfaces formed by simple structural parts.

Still another object of the present invention resides in the provision of guide means for a slidable roof insert which may be readily manufactured, which may be easily installed and which are sufficiently sturdy and rigid for reliable performance in the desired manner.

These and other objects, features and advantages of the present invention will become more obvious from the following description when taken in connection with the accompanying drawing which shows, for purposes of illustration only, one embodiment in accordance with the present invention and wherein:

FIGURE 1 is a top plan view of a motor vehicle provided with a slidable roof,

FIGURE 2 is a top plan view, on an enlarged scale, of the closure mechanism for the slidable roof in accordance with the present invention, FIGURE 3 is a cross-sectional view taken along line 3—3 of FIGURE 2, and FIGURE 4 is a side view of the portion of the closure mechanism in accordance with the present invention which is secured to the vehicle superstructure.

Referring now to the drawing wherein like reference numerals are used throughout the various views to designate corresponding parts, and more particularly to FIGURE 1, reference numeral 1 designates therein a motor vehicle of any suitable construction which includes a relatively fixed roof 2 provided with an aperture 3 which is adapted to be closed off by means of a slidable roof insert 4. The roof insert 4 is thereby guided within a guide frame 5 (FIGURES 1 to 4) of any suitable construction arranged along the inside of the roof 2 in such a manner that the roof insert 4, during opening thereof in the direction toward the rear of the vehicle, slides underneath the relatively fixed part of the roof 2. The closure mechanism of the roof insert 4 consists essentially of closure or locking rods 6 extending transversely to the vehicle longitudinal direction which are adapted to be displaced in the axial or longitudinal direction of rods 6, i.e., in the direction of arrow 15 (FIGURES 2 and 3) or in the opposite direction by means of handle 8 over rod 7 in any suitable, known manner. The locking rods 6, the rod 7 and the handle 8 are suitably secured and/or guided along the inside of the roof insert 4 in any known manner so as to enable the required movements of the rods 6 in the axial directions thereof relative to the roof insert 4 while at the same time moving the roof insert 4 in the up or down direction as will appear more fully hereinafter.

As will become more clear by particular reference to FIGURES 2 and 3, a sliding roller member 9 is supported at the outer end of each locking rod 6. For that purpose, the outer end of the locking rod 6 is constructed in a fork-shaped manner so that the sliding roller member 9 is supported on the supporting bolt member 11 between the two fork arms 10 thereof. A wedging member 12 made of sheet metal is arranged within the guide frame 5 of any suitable construction on both sides thereof and at that place at which the roller member 9 and the locking rod 6 are normally located when the roof aperture 3 is completely closed by the roof insert 4. The wedging surface 13 of the wedging member 12 along which the sliding roller member 9 runs up during outward movement of the locking rod 6 in the direction of the arrow 15 is adapted to be adjusted within limits as to the inclination thereof by means of the threaded pin 14.

During closure of the locking mechanism by appropriate actuation of handle 8, each of the two locking rods 6 is moved by means of rod 7 in the direction of arrow 15 (FIGURES 2 and 3) whereby each sliding roller member 9 which normally rests on recessed portion 16 in guide frame 5 in every position of the roof insert 4 in which the aperture 3 is either fully or partly open runs up along the wedging surfaces 13 of the wedging member 12 and thereby lifts the roof insert 4 until the outer surface thereof is flush with the plane of the outer surface or covering of the relatively fixed part of the roof 2. In order to avoid any difficulties especially with relatively higher vehicle velocities in connection with the opening of aperture 3 in roof 2, i.e., when the roof insert 4 is to be pulled back either partly or completely underneath the fixed part of the roof 2, a sheet-metal guide member 17 is arranged in accordance with the present invention essentially parallel to the wedging surface 13 of the wedging member 12. The distance between the wedging surface 13 and the surface of the sheet-metal guide member 17 facing the same corresponds approximately to the diameter of the sliding roller member 9. The free end 18 of the sheet-metal guide member 17 is slightly bent upwardly so as to facilitate entrance of the sliding roller member 9 in the direction of the arrow 15 into the space between the wedging surface 13 and the sheet-metal guide member 17.

During opening of the closure mechanism, each of the locking rods 6 and therewith each roller member 9 is moved in a direction opposite to arrow 15 and, at that time, the presence of the sheet-metal guide member 17 assures that each sliding roller member 9 during such movement rests in abutment with the corresponding wedging surface 13 so that the roof insert 4 is thereby pulled in the direction toward the vehicle interior space by means of the sliding roller members 9 and the locking rods 6 secured to the roof insert 4. Consequently, the suction of the driving wind cannot become effective on the roof insert 4 in such a manner or to such an extent that the person operating the handle 8 has to pull downwardly the roof insert 4 at the handle 8 against the suction effect.

As is particularly clearly visible in FIGURE 2, each sheet-metal guide member 17 is constructed in parts of the width thereof smaller than the width of the roller member 9 in order to minimize as much as possible the friction between the sliding roller member 9 and the sheet-metal guide member 17. The forward part 18, i.e., the end part 18 of the sheet-metal guide member 17 which extends in the direction toward the vehicle center, projects into the fork of the locking rod 6 between the two fork arms 10 thereof behind the sliding roller member 9. In order to render threaded pin 14 at the wedging member 12 accessible to a tool, for example, to a screw driver, a bore or opening 19 is provided within the forward portion of the sheet-metal guide member 17.

Since the closure mechanism in accordance with the present invention and as described so far hereinabove does not yet assure that in particular the forward edge of the roof insert 4 closes in a tight manner, an additional wedging surface 21 formed by the sheet metal member 20 arranged at an inclination is provided (FIGURE 4) in addition to the wedging member 12 and the sheet-metal guide member 17 which wedging surface 21 is operative by means of locking rod 6 to push or force the roof insert 4 forwardly in the closing direction thereof. For that purpose, a complementary wedging member 22 is arranged laterally at one of the fork arms 10 of the locking rod 6. The sheet-metal wedging member 20 is formed integrally, in one piece, with the sheet-metal guide member 17. An additionally angularly bent sheet-metal member 23 reinforces the sheet-metal wedging member 20 with respect to the guide frame 5.

If the locking rod 6 is moved in the direction of arrow 15 and if the respective sliding roller member 9 runs up along the wedging surface 13 also in the direction of arrow 15 between the wedging surface 13 of the wedging member 12 and the sheet-metal guide member 17, then the complementary wedging member 22 arranged at the one fork arm 10 of the locking rod 6 slides up along the auxiliary wedging surface 21 of the sheet-metal wedging member 20 and thereby pushes the roof insert 4 forwardly in the vehicle direction by means of the locking rod 6 so that the seals arranged along the front end of the roof insert 4 provide a tight seal also with relatively higher vehicle velocities and thereby prevent the penetration of either air or water into the vehicle interior space.

While we have shown and described one embodiment in accordance with the present invention it is understood that the same is not limited thereto but is susceptible of many changes and modifications within the spirit and scope of the present invention and we therefore do not wish to be limited to the details described and shown herein but intend to cover all such changes and modifications as are encompassed by the scope of the appended claims.

We claim:
1. In a motor vehicle having a relatively fixed roof portion provided with an aperture adapted to be closed by a slidable roof insert and including frame means to guide said roof insert during the sliding movement thereof, comprising a slidable roof insert, closure means connected to said roof insert including transversely movable rod members and roller means adjacent the ends of said rod members, said closure means further including wedging surface means adjacent the ends of said rod members, and means secured to said frame means including upwardly inclined first wedging means and guide means vertically spaced above said first wedging means and cooperating with said roller means for positively guiding said roof insert in the up and down direction during both opening and closure of said aperture, and second wedging means contiguous to said first wedging means engaging said wedging surface means of said closure means for forcing said roof insert forwardly substantially concurrently with the guiding of said roof insert upwardly by said first wedging means.

2. Apparatus according to claim 1, wherein the free end of said sheet-metal guide member is bent upwardly slightly.

3. Apparatus according to claim 1, wherein one end of each locking rod member is constructed in a fork-shaped manner supporting said roller means and wherein said sheet-metal guide member extends partly through the fork aperture behind said roller means with said roof insert in said closed position.

4. Apparatus according to claim 1, wherein said second wedging means is formed by an angularly bent sheet-metal member having a leg portion forming the wedging surface thereof, and reinforcing sheet-metal means for reinforcing said angularly bent sheet-metal member.

5. Apparatus according to claim 1, wherein said second wedging means is formed by an angle iron formed integrally with said guide means constructed as a sheet-metal guide member.

6. In a motor vehicle having a relatively fixed roof portion provided with an aperture adapted to be closed or by a slidable roof insert and including frame means to guide said roof insert during the sliding movements thereof, comprising a slidable roof insert, closure means connected to said roof insert including transversely movable rod members and sliding roller means adjacent the ends of said rod members, said closure means further including inclined wedging surface means adjacent the ends of said rod members, said wedging surface means being on the rear side of said closure means, and means secured to said frame means including upwardly inclined first wedging means cooperating with said roller means for guiding said roof insert in the up and down direction during both opening and closure of said aperture, and second wedging means contiguous to said first wedging means engaging said wedging surface means of said closure means for forcing said roof insert forwardly substantially concurrently with the guiding of said roof insert upwardly by said first wedging means to assure a tight fit along the entire leading edge of said roof insert in the closed position.

7. In a motor vehicle having a relatively fixed roof portion provided with an aperture adapted to be closed by a slidable roof insert and including frame means to guide said roof insert during the sliding movements thereof, comprising a slidable roof insert, closure means connected to said roof insert including transversely movable rod members and roller means adjacent the ends of said rod members, said closure means further including wedging surface means adjacent the ends of said rod members, and means secured to said frame means including upwardly inclined first wedging means and guide means vertically spaced above said first wedging means and cooperating with said roller means for positively guiding said roof insert in the up and down direction during both opening and closure of said aperture, said guide means being essentially parallel to said first wedging means and spaced therefrom a distance substantially corresponding to the diameter of said roller means, and second wedging means contiguous to said first wedging means engaging said wedging surface means of said closure means for forcing said roof insert forwardly substantially concurrently with the guiding of said roof insert upwardly by said first wedging means.

8. In a motor vehicle having a relatively fixed roof portion provided with an aperture adapted to be closed by a slidable roof insert and including frame means to guide said roof insert during the sliding movement thereof, closure means connected to said roof insert including transversely movable rod members and roller means adjacent the end of said rod members, first wedging means cooperating with said roller means during both opening and closure of said aperture, and second wedging means contiguous to said first wedging means for forcing said roof insert forwardly substantially in the closed position thereof, the improvement comprising guide means vertically spaced a predetermined distance above said first wedging means, said guide means cooperating with said roller means for positively guiding said roof insert during opening of said aperture.

9. A closure mechanism for slidable roofs in vehicles, especially motor vehicles, having a relatively fixed roof part provided with an aperture adatped to be closed off by a slidable roof insert, comprising a slidable roof insert, guide frame means secured within said vehicle for slidingly guiding said roof insert to enable sliding movement thereof from the closed position thereof in which it closes said aperture into the opened position thereof in which said aperture is laid bare and said slidable roof insert slides beneath said relaively fixed roof portion, wedging means operatively associated with said guide frame means, closure means operatively associated with said roof insert including transversely movable locking rod means provided with sliding means cooperating with said wedging means in the closed position of said roof insert in order to lift said roof insert in said closed position into the plane of said relatively fixed roof portion, guide means above said wedging means extending essentially parallel to said wedging means for positively guiding said sliding means duing displacement in the transverse direction, one end of said locking rod means being constructed in a fork-shaped manner and means for supporting said sliding means at said fork-shaped end, said guide means extending partly into the aperture formed by said fork-shaped end with said roof insert in said closed position.

References Cited in the file of this patent

UNITED STATES PATENTS

| | | |
|---|---|---|
| 1,737,627 | Wear | Dec. 3, 1929 |
| 1,820,715 | Vance | Aug. 25, 1931 |
| 2,201,330 | Wernig et al. | May 21, 1940 |
| 2,242,844 | Baier et al. | May 20, 1941 |
| 2,338,225 | Ball | Jan. 4, 1944 |
| 2,338,309 | Votypka | Jan. 4, 1944 |
| 2,841,441 | Evans | July 1, 1958 |

FOREIGN PATENTS

| | | |
|---|---|---|
| 1,063,472 | Germany | Aug. 13, 1959 |
| 528,454 | Great Britain | Oct. 30, 1940 |
| 751,332 | Great Britain | June 27, 1956 |